Feb. 27, 1951     S. H. MARSH     2,543,324
ROTARY CROP DIVIDER FOR HARVESTERS
Filed July 30, 1949
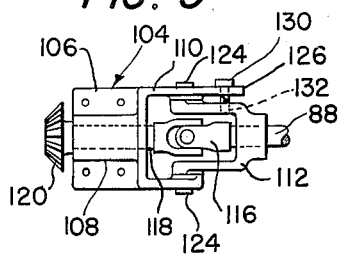
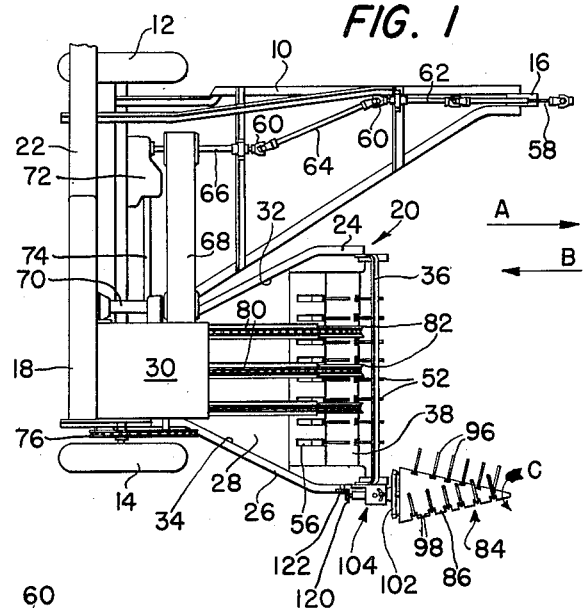
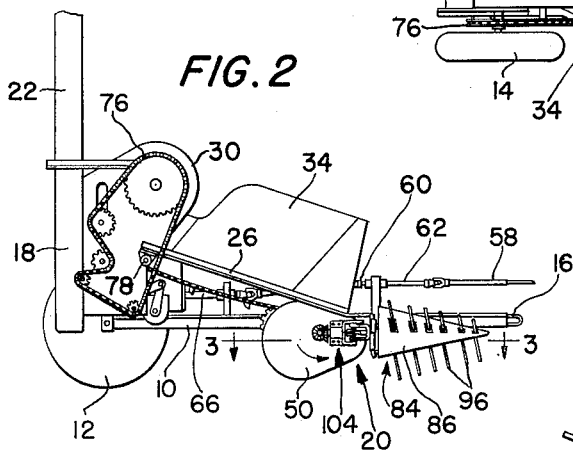
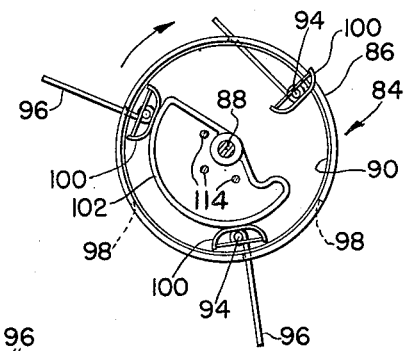
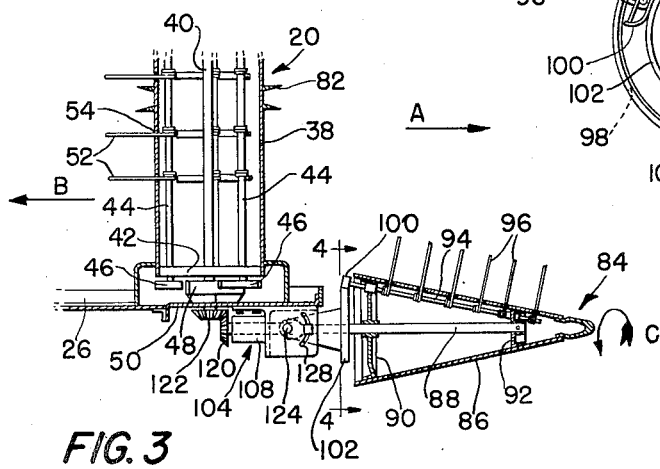
*INVENTOR.*
STANLEY H. MARSH
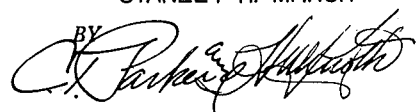
ATTORNEYS Patented Feb. 27, 1951

2,543,324

UNITED STATES PATENT OFFICE 2,543,324

ROTARY CROP DIVIDER FOR HARVESTERS

Stanley Herbert Marsh, Beloit, Wis., assignor to Deere Manufacturing Co., Dubuque, Iowa, a corporation of Iowa Application July 30, 1949, Serial No. 107,707

11 Claims. (Cl. 56—317)

This invention relates to a harvester and more particularly to a rotary crop divider for a harvester of the type utilized for picking up hay and similar crops.

An example of the general class of harvester referred to is the so-called forage harvester which is operated either in conjunction with or subsequent to a machine that cuts the standing crops and leaves the crops lying in swaths in the field; the forage harvester is equipped with appropriate pick-up means for gathering the cut crops and feeding such crops to crop-handling means which, in the usual case, comprises a chopper or other crop-reducing means and a suitable blower or similar conveyor for transfering the reduced crops to a wagon or other vehicle operated in conjunction with the harvester. Normally, the crop (hay, for example) is cut by a mower and the swaths are subsequently raked into windrows by a side-delivery rake. Thereafter, the forage harvester with its pick-up attachment is driven over the field and the windrows are gathered. In many instances, however, it is desired to pick up the green hay directly; that is, it is desired to omit the side raking operation. In instances such as these, there is a pronounced disadvantage in that the ordinary pick-up on the forage harvester is not capable of handling the hay from the swaths, since the hay becomes entangled with the outer end of the pick-up and balls or bunches at this point and under the wheel of the harvester. Although the conventional forage harvester is equipped with a divider in the form of a rod or shield, such divider is not adequate to avoid the complication noted.

According to the present invention, there is provided, preferably as an attachment, a divider comprising movable means for separating or dividing the swaths so that a suitable portion of the swath may be picked up cleanly and without any entanglements or balling up under the pickup or the harvester wheel. Specifically, it is an object of this invention to provide the improved divider in the form of a rotary element having members or fingers thereon for moving the crops laterally of the direction of travel of the harvester so that as the pick-up gathers hay from the swaths and transfers such hay rearwardly, the rotary divider will move hay ahead of and at the outer end of the pick-up outwardly from that portion of the swath engaged by the pickup. Another object of the invention is to provide the movable or rotary divider with cropengaging fingers of the disappearing-finger type. Still another object of the invention is to provide the divider as a convenient attachment for forage harvesters of known designs. Yet another object of the invention is to provide driving means for driving the rotary divider from the rotary pick-up device.

The foregoing and other important objects and desirable features inherent in and encompassed by the invention will become apparent as a disclosure of a preferred form of the invention is completely made in the following detailed description and accompanying sheet of drawings, in which Figure 1 is a plan view of a forage harvester equipped with the rotary divider device;

Figure 2 is a side elevational view of the harvester shown in Figure 1, with parts removed to clarify the illustration;

Figure 3 is a fragmentary sectional view, drawn to an enlarged scale, taken substantially along the line 3—3 of Figure 2;

Figure 4 is an enlarged sectional view taken substantially on the line 4—4 of Figure 3; and Figure 5 is an enlarged side elevational view of the mounting or supporting bracket for the attachment.

The forage harvester structure shown in the drawing is merely representative of several forms that the machine could assume. Likewise, the preferred form of the rotary divider illustrated and described herein is typical and the selection of the particular design in either case for the purposes of illustration is not intended to exclude other designs. Consequently, the present disclosure should be taken as illustrative and not limiting.

The forage harvester selected for the purposes of illustration comprises a main frame 10 rendered mobile by means of left-hand and righthand carrying wheels 12 and 14. The forward portion of the frame is provided with a hitch device 16 by means of which the harvester may be connected to a tractor or other suitable vehicle to be drawn forwardly over a field in which hay or similar crops have been cut and left lying in swaths.

The forage harvester illustrated is of the type shown in the U. S. patent to Hill 2,347,907 and has at its rear end crop-handling or -treating means including a blower housing 18 which receives crops from a pick-up device 20, reduces such crops by chopping, and delivers the crops through a conveyor or outlet duct 22. The pickup device is ahead of the blower housing 18 and the conveyor duct 22 extends laterally of the direction of travel of the harvester.

The pick-up device is part of crop-gathering mechanism carried by the main frame 10 by means of a pair of forwardly diverging and downwardly extending frame bars 24 and 26 between which is carried an upwardly and rearwardly inclining platform 28. This platform leads to a feeder house 30 ahead of the blower housing 18. Side sheets or walls 32 and 34 are carried respectively by the frame bars 24 and 26, and further delineate the platform 28. The forward ends of the frame bars 24 and 26 are cross-connected by a transverse arch 36.

The pick-up device itself comprises an elongated cylinder 38 disposed transverse to the line of travel and carried at opposite ends by suitable bearings (not shown) in the frame structure comprising the frame bars 24 and 26. The particular form of pick-up device illustrated is merely one of several types known in the art. The details of this pick-up device are disclosed in the Hill patent mentioned above.

Briefly, the pick-up device comprises the elongated cylinder 38 and a central shaft 40 by means of which the cylinder is carried. Figure 3 shows the construction at one end of the cylinder and it may be assumed that the construction at the other end, with the exceptions to be presently noted, is similar. The shaft 40 carries at its right-hand end a spider or mounting member 42 which is secured to the shaft and which fits within and is secured to the cylinder 38. This spider carries a plurality of parallel shafts 44 within the cylinder and radially spaced from the central shaft 40. As suggested above, a similar spider is at the left-hand end of the shaft and the left-hand ends of the plurality of shafts 44 are carried in such spider. The right-hand ends of the shafts 44 project through the spider 42 and each has fixed thereto a control cam 46. The cams 46 are governed by a master cam 48 which is fixed to part of the frame structure comprising the frame bar 26 and a housing or enclosure 50 over the right-hand end of the cylinder 38.

Each of the shafts 44 carries a plurality of crop-engaging members in the form of resilient fingers 52 which project respectively through appropriate peripheral slots 54 in the cylinder 38, the details of which are fully disclosed in the Hill patent identified above. The cylinder 38 is rotated in the direction of the arrow in Figure 2 and the fingers 52 at the bottom portion of the cylinder are extended downwardly and forwardly to pick up hay from the field. As the cylinder rotates rearwardly toward the platform 28, the fingers deliver the picked up hay to the platform and then are retracted in the known manner to strip the crops therefrom, operating through appropriate slots 56 in the forward portion of the platform.

Power for rotating the pick-up device is supplied by means of a power shaft 58 which projects at the forward end of the frame 10 and which is adapted to be connected to the power take-off shaft of the propelling vehicle. The shaft 58 extends rearwardly through suitable universal joints 60 and shaft sections 62, 64 and 66 to drive a flat belt 68 which in turn drives a shaft 70 for rotating a blower (not shown) contained within the blower housing 18. The shaft 66 further drives suitable gearing (not shown) contained in a gear casing 72, and power is transmitted from the gear casing through a transverse shaft 74 to a chain 76 and suitable sprocket at the right-hand side of the feeder house 30.

There is rotatably carried at the junction of the platform 28 a feeder house 30 a transverse shaft 78 (Figure 2) on which is fixed a plurality of sheaves (not shown) for driving a plurality of conveyor chains 80 (Figure 1). These chains are trained about sheaves 82 formed on the outer surface of the drum or cylinder 38. The shaft 78 may be driven in any suitable manner from the shaft 74, as indicated in the Hill patent referred to above.

The construction thus far described is largely conventional and operates as follows: The harvester is drawn over the field in a forward direction and the pick-up device 20 functions as described above to pick hay from the swaths and delivers such hay to the crop-handling means comprising the platform 28 and rearwardly moving chains 80. The crop is transferred from this means to the feeder house 30 whence it is moved into the blower housing 18, reduced, and delivered outwardly through the conveyor duct 22. As mentioned above, a conventional machine of this type, when operating to pick up cut hay or other crop directly from the swath, is subject to the disadvantage that material becomes entangled at the outer or right-hand end of the pick-up and ultimately bunches or balls up under the right-hand wheel 14. This disadvantage is not particularly noticeable at the inner end of the pick-up, since the left-hand wheel 12 is considerably laterally spaced from the left-hand end of the pick-up. According to the present invention, improved divider means is provided for eliminating the disadvantage referred to.

The rotary device is designated generally by the numeral 84. In its preferred form, it includes a conical element 86 preferably formed of lightweight sheet metal suitable for the purposes. This sheet metal cone is disposed horizontally with its axis substantially at right angles to the axis of the cylinder or drum 38. The cone is carried for rotation by a longitudinal shaft 88 which is provided with axially spaced-apart spiders 90 and 92 respectively at the base and apex ends of the cone. These spiders are fixed to the shaft 88 and their peripheral portions are fixed to the shell of the cone. A plurality of longitudinally extending control shafts 94 extends from the base to the apex of, and within, the cone and parallels the elements of the cone. Each shaft is journaled at opposite end portions thereof in the spiders 90 and 92 and each shaft carries a plurality of crop-engaging members in the form of spring fingers 96 similar to the fingers 52 on the pick-up device 20. The cone is appropriately slotted at 98 to accommodate the fingers 96, these slots being similar to the slots 54 in the drum 38.

Each of the shafts 94 projects rearwardly through the spider 90 and carries a control cam 100 which is cooperative with a master cam 102 for effecting extension and retraction of the finger 96 as the conical element 86 rotates.

In the drawing the arrow A indicates the direction of travel of the harvester unit, the arrow B indicates the direction of movement of picked up material, and the arrow C indicates the direction of movement of the material as effected by the device 84. The direction of rotation of the cone 86 is indicated by an arrow in Figure 4.

The divider device 84 is carried by part of the harvester frame structure, preferably by means of a bracket or support 104 rigidly secured to that portion of the harvester frame comprising the side frame member 26 and housing 50, as will be apparent in Figure 3. A larger illustration of the support 104 appears in Figure 5.

This support has an inner flange 106 which provides means for the mounting thereof on the housing part 50, and further has an integral portion providing a bearing 108 and preferably a second integral portion providing a yoke 110. This yoke is connected on a vertical axis to a second yoke 112 which is in turn rigidly secured to the master cam 102 of the divider device 84. The manner of securing the cam 102 to the second yoke 112 may include a plurality of cap screws 114, as suggested in Figure 4. The cam 102 is thus rigidly mounted and held against rotation while the cone 86 may rotate with the shaft 88.

The shaft 88 extends rearwardly through the cam 102 and second yoke 112 and is connected by a universal joint 116 to a short shaft 118 journaled in the bearing portion 108 of the support 104. The rear end of the shaft 118 has keyed thereto a bevel pinion 120 which is in constant mesh with a bevel pinion 122 which has means for fixed connection to and for rotation with the rigid-hand or outer end of the pick-up shaft 49.

The connection on a vertical axis between the yokes 110 and 112 is effected by a pair of vertically coaxial pins 124. The common axis of the pins is substantially coincident with the plane of the axes of the universal joint 116. The upper arm of the yoke 110 is extended forwardly, as at 126 (Figure 5), and is provided with an arcuate slot 128 about the axis at 124 (Figure 3). A cap screw 130 passes through the slot 128 and into a tapped bore 132 provided in an upper portion of the yoke 112. The construction just described provides means for arranging the device 84 for adjustment about the axis at 124 and the cap screw 130 provides means for securing any position of adjustment. Hence, the device 84 may be selectively positioned at different angles with respect to the axis of the pick-up drum or cylinder 38.

The operation of the harvester equipped with the preferred form of the divider device has been covered above in connection with the description of the construction thereof. Various features of the invention not specifically enumerated herein will undoubtedly occur to those versed in the art, as will numerous modifications and alterations in the preferred form of the invention illustrated, all of which may be accomplished without departing from the spirit and scope of the invention as defined in the appended claims.

What is claimed is:

1. A crop-gathering machine, comprising: a mobile unit adapted to advance over a field of crops; means at a forward portion of the unit for gathering crops, including a pick-up device rotatable about a transverse horizontal axis for picking up cut crops and moving such crops in a rearward direction; and a crop divider carried by the unit in advance of the pick-up device, including a crop-handling element rotatable on a substantially longitudinal, generally horizontal axis and having crop-engaging means thereon for engaging cut crops ahead of the pick-up device for moving such crops laterally.

2. The invention defined in claim 1, further characterized in that: the crop-handling element is of generally conical shape formed about its axis of rotation and having its apex to the front.

3. The invention defined in claim 1, further characterized in that: means is provided for mounting the crop-handling element on the unit for lateral adjustment relative to the pick-up device.

4. The invention defined in claim 1, further characterized in that: driving means interconnects the pick-up device and the crop-handling element for rotation in unison.

5. A crop-gathering machine, comprising: a mobile unit adapted to advance over a field of crops; means at a forward portion of the unit for gathering crops; means on the unit rearwardly of the gathering means for receiving gathered crops; and a crop divider carried by the unit at one side thereof and positioned ahead of the gathering means and including means rotatable on a generally horizontal, fore and aft extending axis.

6. A crop-gathering machine, comprising: a mobile unit adapted to advance over a field of crops; means at a forward portion of the unit for gathering crops from the field and moving such crops in a rearward direction; crop-handling means carried by the frame at one side thereof and positioned ahead of the gathering means, including a drivable crop-engaging element movable transverse to the direction of movement of crops by the gathering means and means for driving the crop-engaging element.

7. An attachment for a crop-harvester of the type having a rotary pick-up device disposed transverse to the direction of advance of the harvester over a field of crops, comprising: a support having means for the mounting thereof on the harvester at one end of the pick-up device; an elongated shaft journaled in the support and adapted to project forwardly from said end of the pick-up device; a conical element coaxial with and fixed to the shaft to have its apex to the front; and crop-engaging members carried by the conical element.

8. The invention defined in claim 7, further characterized in that: the rear end of the shaft extends behind the base of the conical element and has means thereon for establishing a driving connection to a driven part of the harvester.

9. The invention defined in claim 7, further characterized in that: the support includes provision for adjustment of the shaft and conical element in a direction transverse to the normal extension of the shaft axis.

10. The invention defined in claim 7, further characterized in that: the crop-engaging members are carried by the conical element for timed extension and retraction; and means are provided for extending and retracting said members.

11. An attachment for a crop-harvester of the type having a pick-up device disposed transverse to the direction of advance of the harvester over a field of crops and including an upright wall structure at one side generally paralleling the line of advance, comprising: a support having means for the mounting thereof on the harvester adjacent the upright wall structure and including a journal having an axis in a plane generaly paralleling the plane of the wall structure; a crop-divider element carried by the support for rotation on said axis and projecting ahead of the wall structure; and crop-engaging means carried by said element.

STANLEY HERBERT MARSH.

REFERENCES CITED

The following references are of record in the file of this patent:

UNITED STATES PATENTS

| Number | Name | Date |
| --- | --- | --- |
| 541,093 | Johnson | June 18, 1895 |
| 1,873,439 | Livesay | Aug. 23, 1932 |
| 1,882,875 | Pierson | Oct. 18, 1932 |
| 2,347,907 | Hill | May 2, 1944 |